US009625290B1

(12) United States Patent
Chang et al.

(10) Patent No.: US 9,625,290 B1
(45) Date of Patent: Apr. 18, 2017

(54) DYNAMIC CALIBRATION OF MEMS SENSORS

(71) Applicant: GOOGLE INC., Mountain View, CA (US)

(72) Inventors: Edward Chang, San Jose, CA (US); Qingxuan Yang, Beijing (CN)

(73) Assignee: GOOGLE INC., Mountain View, CA (US)

( * ) Notice: Subject to any disclaimer, the term of this patent is extended or adjusted under 35 U.S.C. 154(b) by 587 days.

(21) Appl. No.: 14/089,984

(22) Filed: Nov. 26, 2013

(51) Int. Cl.
G01D 18/00 (2006.01)

(52) U.S. Cl.
CPC .................. G01D 18/008 (2013.01)

(58) Field of Classification Search
CPC .. G01D 18/008; G01D 18/002; G01D 18/006; G01D 3/022; G01C 17/38; G01C 25/00; G01C 25/005; G01P 21/00; H03B 5/04; H03L 1/025; H03L 1/026
See application file for complete search history.

(56) References Cited

U.S. PATENT DOCUMENTS

| 6,498,996 | B1 * | 12/2002 | Vallot | G01C 19/56 702/103 |
| 7,421,792 | B2 | 9/2008 | Kwon et al. | |
| 8,583,371 | B1 * | 11/2013 | Goodzeit | G01C 19/5776 701/501 |
| 2005/0151592 | A1 * | 7/2005 | Partridge | H03B 5/04 331/16 |
| 2010/0188115 | A1 * | 7/2010 | von Kaenel | G06F 1/3203 326/16 |
| 2010/0244945 | A1 * | 9/2010 | Hahn | H03H 7/0153 327/553 |
| 2010/0312513 | A1 | 12/2010 | Mayor et al. | |
| 2010/0317295 | A1 | 12/2010 | Borsella et al. | |
| 2011/0106474 | A1 | 5/2011 | Kulik et al. | |
| 2011/0178707 | A1 | 7/2011 | Sachs et al. | |
| 2013/0317772 | A1 * | 11/2013 | Dawson | G01L 27/002 702/98 |

* cited by examiner

Primary Examiner — Manuel L Barbee
(74) Attorney, Agent, or Firm — Morris & Kamlay LLP

(57) ABSTRACT

A MEMS type sensor is used for measuring a particular parameter on an IC chip within an electronic device, such as music player, a smart cellular telephone, etc. The parameter may be a scalar parameter, such as a directional orientation indicative a current compass point, or a multidimensional vector parameter, such as a three-dimensional acceleration. The sensor output is recalibrated using stored coefficients when ambient conditions vary. The stored coefficients may be modified during calibration.

28 Claims, 3 Drawing Sheets

DYNAMIC CALIBRATION OF MEMS SENSORS

FIELD

This application pertains to a method and apparatus for compensating the outputs of MEMS sensors for thermal variations. More specifically, in response to a temperature change, the outputs of MEMS sensors are recalibrated using coefficients related to a temperature or temperature change.

BACKGROUND

In the present application the term MEMS sensor is used generically to cover a microelectronic and microelectromechanical system having mechanical elements (usually on a single chip) with minute physical dimensions in the micro- as well as nano-meter range. As such, the term is also meant to cover nanosensors and other similar devices.

MEMS sensors are made in various configurations for sensing certain physical instantaneous parameters such as acceleration, magnetic field direction and intensity, etc. MEMS sensors have wide range uses including such diverse systems as accelerometers triggering air bags in automotive applications, electronic compasses, GPS navigational subsystems in mobile devices, etc. Typically, these sensors generate measurements that are either scalars or multidimensional vectors. For example, both acceleration and magnetic fields are expressed as three-dimensional vectors, and hence, the respective sensors generate multidimensional outputs.

It is well known that MEMS outputs are generally non-linear responses to inputs and must be calibrated for these non-linear effects using appropriate coefficients. Moreover, the MEMS response is not stable over time but changes frequently in response to environmental variations, and these changes produce environmental artifacts in the MEMS outputs that must be eliminated by recalibrating the outputs. In other words, the outputs of MEMS are not reliable unless they are frequently checked and recalibrated to eliminate environmental artifacts to match or compensate for environmental and ambient changes.

The processes necessary to recomputed the calibration coefficients can be fairly complicated, especially for multi-dimensional sensors, requiring complex matrix operations. Therefore each recalibration slows down and even suspends the process of obtaining the requirement measurements from the sensor. Moreover, when the MEMS are incorporated into mobile or portable devices, such recalibrations use up valuable resources within the portable device, including microprocessor time, and power. This last consideration is especially important in battery operated devices. One environmental effect that consistently requires the recalibration of the outputs of MEMS is temperature variation.

Accordingly there is a need to provide a simpler, faster and less energy consuming way of recalibrating the outputs of MEMS sensors, especially to compensate for temperature variations.

SUMMARY

The present application pertains to an apparatus for calibrating measurements obtained from a MEMS type sensor. The apparatus includes a calibration circuit that receives the measurements from a MEMS sensor as an input signal. This measurement may be a scalar quantity. For example, for an electronic compass, the measurement is a magnetic direction. Other MEMS sensors, for example, accelerometers, may generate a measurement that is a multidimensional vector. The calibration circuit then operates on the input signal using one or more calibration coefficients to compensate for various known artifacts to generate an output signal (that, again, could be scalar or multidimensional) suitable for manipulation by a microprocessor.

In the present application, a temperature sensor measures a temperature related to the MEMS sensor. If this temperature has remained substantially unchanged, the present calibration parameters remain to be effective. If there is a drastic change in the temperature, or in the rate of change of temperature, then a microprocessor obtains at least one new calibration coefficient corresponding to the new temperature (if available). This new calibration coefficient is then used in the calibration circuit for the current or latest measurement.

A memory is used to store a set of calibration coefficients for each of several temperatures. The memory can be prepopulated with the coefficients. If no calibration coefficient(s) is found for a particular temperature, then the microprocessor calculates the new coefficient, performing a known recalibration process, and the new calibration coefficient thus obtained is then not only used for the next calibration but is stored in the memory to be used when necessary.

DETAILED DESCRIPTION

Figure 1:
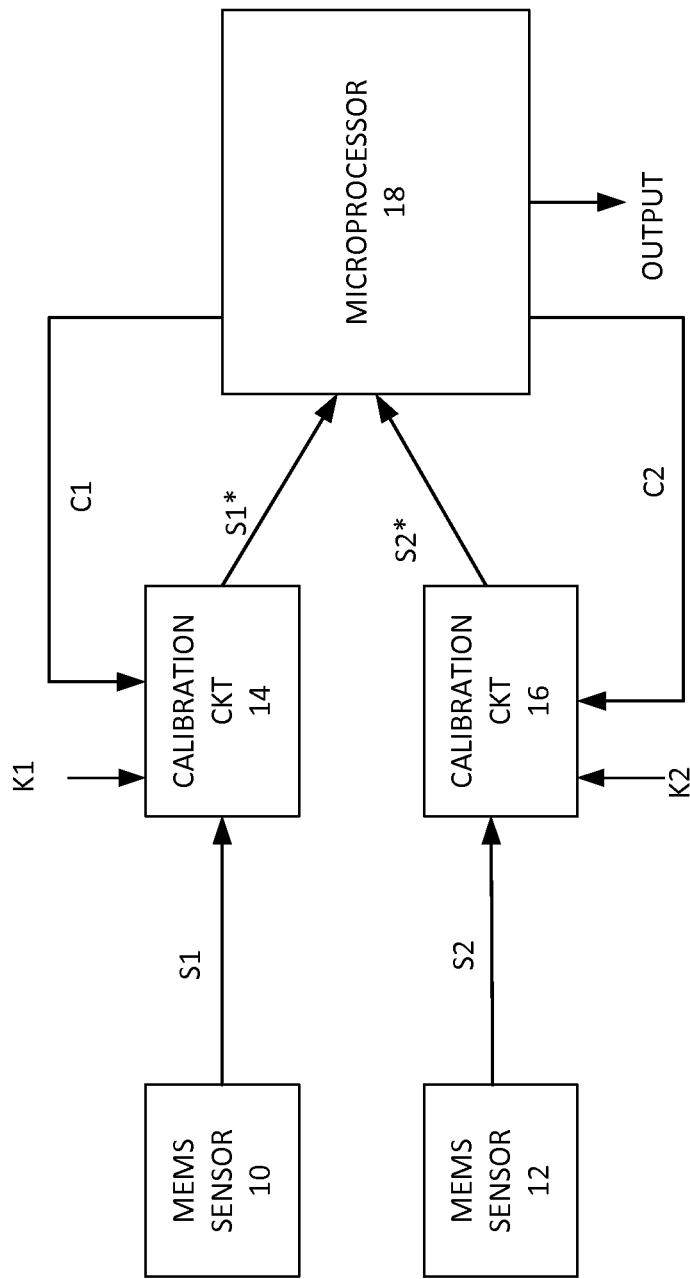
FIG. 1 shows a block diagram of a prior art subassembly for a MEMS sensor.

As previously discussed, various systems may have one or more MEMS sensors. FIG. 1 shows a conventional system with two MEMS sensors 10, 12. The two sensors 10, 12 measure some ambient conditions and produce respective raw sensor signals S1 and S2, respectively, indicative of these conditions. Respective calibration circuits 14, 16 transform these signals S1 and S2 into transformed sensor signals S1*, S2* suitable for a microprocessor 18. For the purposes of this discussion, the term calibration can include various manipulations, including scaling, offsetting, etc. Moreover, if the sensor signals are multidimensional vectors, the calibrations may include more complex manipulations, including angular rotations of the vectors and matrix operations. These operations require respective calibration coefficients K1, K2. Depending on the sensor, each of the calibration coefficients K1, K2 may have a single or a set of scalar or vector values. The values of calibration coefficients K1, K2 must be recalibrated frequently to compensate for various ambient conditions. In some instances, the recalibration may have to be repeated. The calibration circuits and/or the means to perform the recalibrations can be implemented by software in the microprocessor 18; however, the calibration circuits 14, 16 are shown as separate elements for the sake of clarity.

The recalibrations are time consuming and use up power and computational resources.

Figure 2:
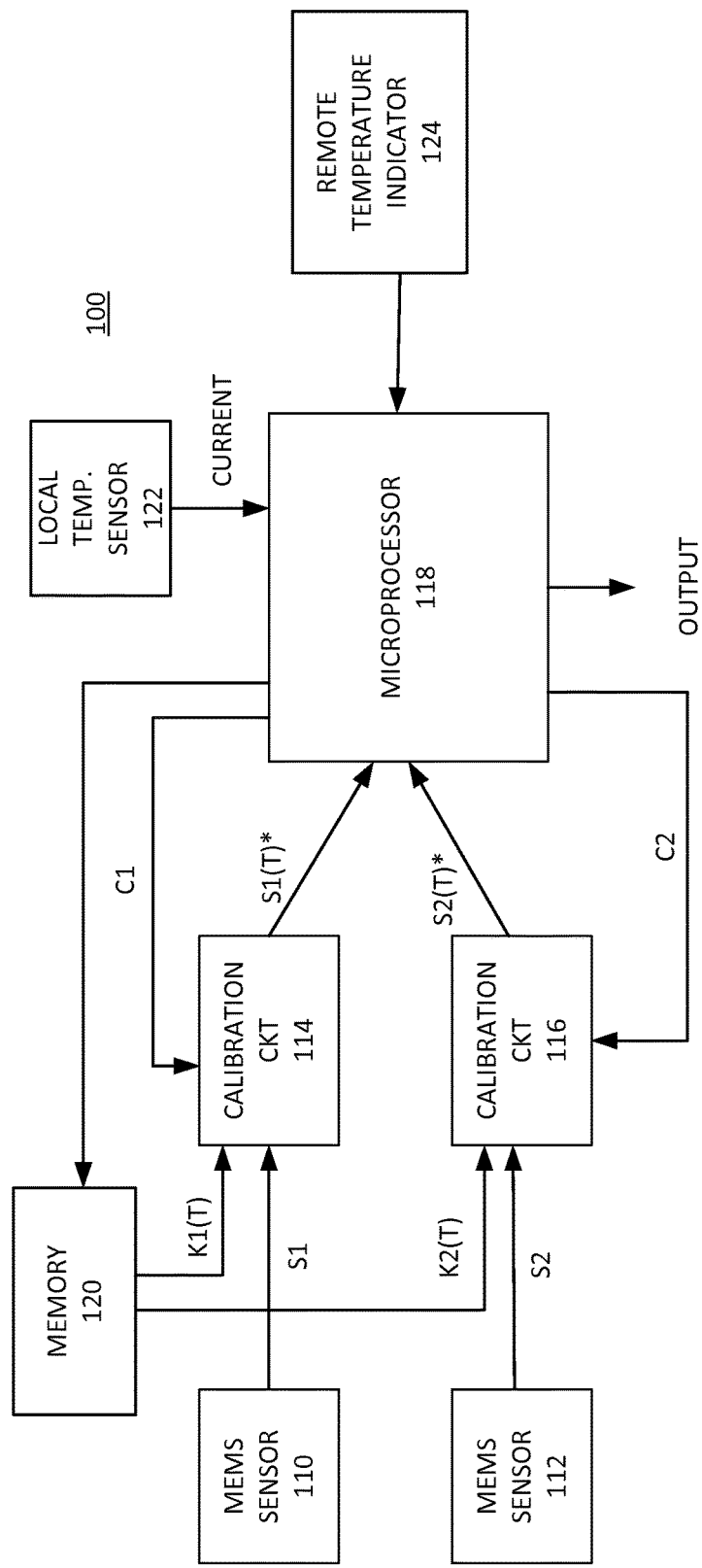
FIG. 2 shows a block diagram of a subassembly incorporating a MEMS sensor.
Figure 3:
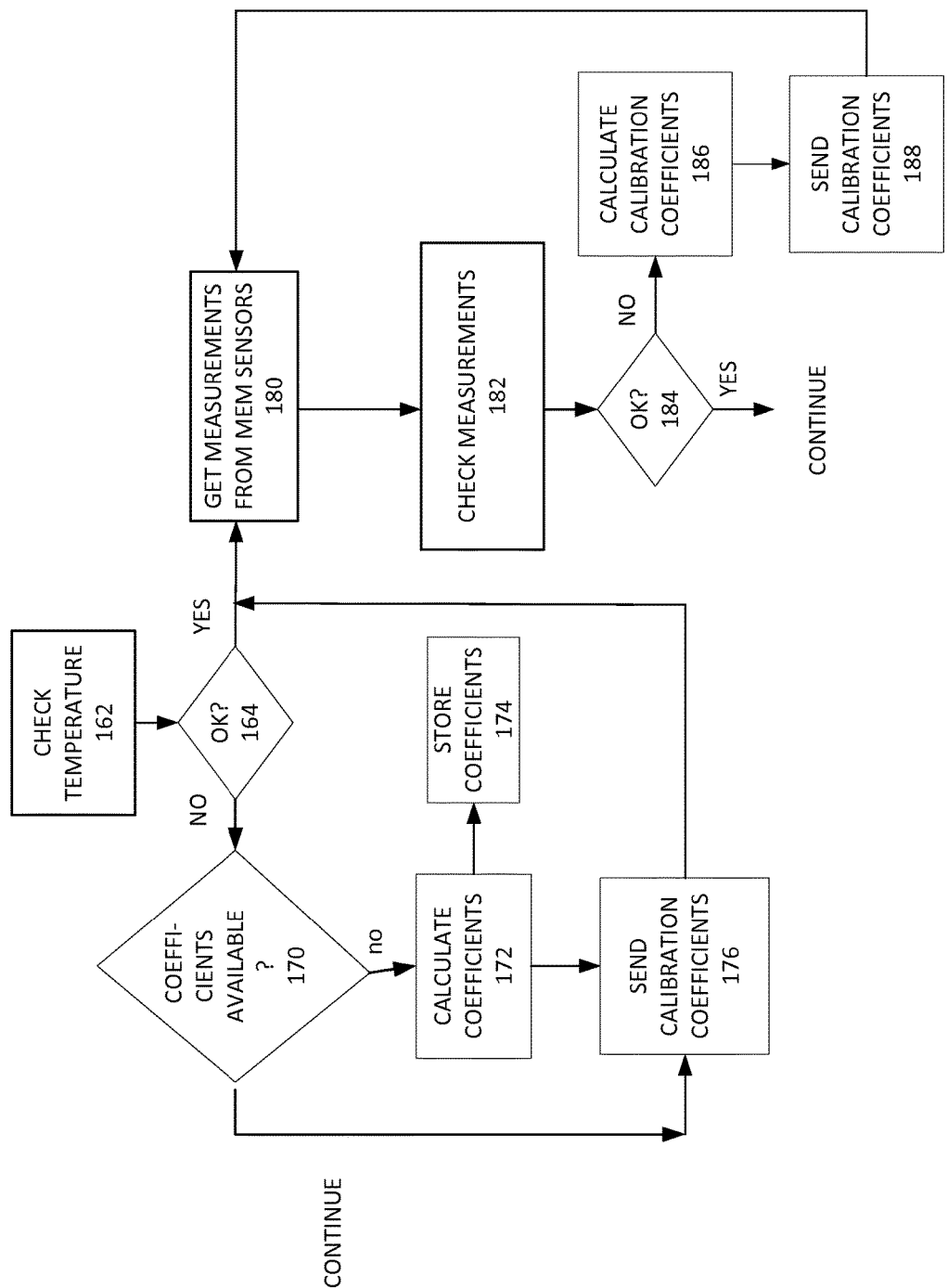
FIG. 3 shows a flow chart for the operation of the subassembly of FIG. 2.

FIG. 2 shows an example of a system constructed in accordance with this disclosure; its operation is show in FIG. 3. The system 100 includes MEMS sensors 110, 112, calibration circuits 114, 116 and a microprocessor 118. The system further includes a memory 120 and a local temperature sensor 122. In one embodiment, the components shown in FIG. 2 are disposed on a single chip.

As previously discussed, the responses of MEMS sensors 110, 112 are unstable over time to variations in environmental conditions, e.g., temperature. Some of these variations may be predictable, others may not. For example, the elements shown in FIG. 2 may be disposed on an IC that contains many other heat generating components of a device such as a mobile cell phone. Additionally, the microprocessor 118 may be performing operations related to other functions of the cell phone. Predictable events that result in ambient temperature changes include drastic changes in the work load on the IC components, normal seasonal temperature changes, or temperature differentials between day and night. Unpredictable events that result in significant temperature variations include a user carrying a cell phone in and out of buildings, placing the cell phone into or removing the cell phone from his pocket or other closed environment.

Memory 120 is used to hold a plurality of calibration coefficients K(T). For example, K1(0) may be the set of coefficients for MEMS 110 at 0° C., K2(20) may be the set of coefficients for MEMS 112 at 20° C., and so on.

The system 100 compensates for temperature variations as follows. In step 162 (FIG. 3) the microprocessor 118 checks a temperature, as indicated, for example, by a local temperature sensor 122. This temperature may be the temperature of the IC of the device incorporating the system 100, and/or an ambient temperature. The ambient temperature may also be obtained from a remote sensor 124. This remote sensor 124 may be provided in the vicinity of the outer surface of the device.

In step 164 the microprocessor 118 checks the current temperature.

If there has been a temperature change that exceeds a predetermined value, if the temperature measured by sensor 122 reaches a certain value or if some other temperature-related criteria are met, indicating that the calibration coefficients must be recalibrated, then an automatic recalibration is implemented as described below.

In step 170 the memory 120 is checked to see if there are calibration coefficients K available for the new temperature. These coefficients K may be determined by the manufacturer during the design stage of the subject device or system 100 and stored in the memory. In some cases, that may be too time consuming, especially since the manufacturer may not know the exact temperatures at which the system 100 will be operating. Moreover, some MEMS are so sensitive that two identical MEMS having the same specifications, and resulting from the same batch, may exhibit different response characteristics and therefore the coefficients may vary even for the same device.

Thus, if no coefficients are found in memory 120, then in step 172 a new set of calibration coefficients are calculated, using a known recalibration process. In step 174, these coefficients are stored in memory 120 and set as the active coefficients for the calibration circuits 114, 116.

If in step 170 a set of coefficients are found in memory 120 then they are retrieved and in step 176 set as the active coefficients to the calibration circuits 114, 116.

If in step 164 it is determined that the temperature has not changed significantly since the previous temperature measurements, then the microprocessor 118 in step 180 sends control signals C1, C2 to the calibration circuits 114, 116, and obtains the measurements or signals S1(T)*, S2(T)* from calibration circuits 114, 116. (Alternatively, if the calibration coefficients have just been recalibrated, as described above, then the signals S1(T)*, S2(T)* are calculated using the new calibration coefficients obtained by the calibration circuits 114, 116 in step 176.)

These signals can be used as they are or the system may be programmed to check them first. For this latter scenario, in step 182, the signals S1(T)*, S2(T)* are tested to make sure that they are acceptable. This step may include checking whether the signals are within a range, whether they are changing too fast or too slow, etc. If the parameters being monitored by the sensors 10, 12 are related to each other, then the signals may be checked against each other. As mentioned above, this step is needed because MEMS are known to be unstable and their operation may be affected by various ambient or other conditions.

In step 184, if the tests indicate that the signals are acceptable, then the microprocessor 118 continues its normal operation. If the signals S1(T)*, S2 (T)* are found unacceptable, then the microprocessor sends control signals C1, C2 requesting the calibration circuits to perform a respective recalibration process. As part of recalibration, for example, in step 186 a new set of calibration coefficients are determined and set as coefficients K1, K2 in step 188. Then, in step 180 new values for signals S1(T)*, S2(T)* are obtained using the latest coefficients and the whole process is then repeated. In some instances (for instance, when there is a drastic change in ambient conditions), the recalibration may have to be performed several times before the values of S1* and S2* are found acceptable.

In addition, calibration coefficients may be saved and used for other special occasions as well. For example, sets of calibration coefficients may be Recalibration may be performed under other conditions as well. For example, one of coefficients may be used when a low battery condition is detected.

In another embodiment, the decision making process is expanded to take in consideration other factors, that may indicate that performing a recalibration may not be advisable. In such instances, it may be more advantageous to use either the last set of calibration coefficients, or to use a set of coefficients selected specifically for some predetermined conditions. For example, if the demand (or load) on microprocessor 118 is very heavy it may not be desirable to further increase the load on the microprocessor 118 by requiring it to perform a recalculation process. Instead, the last set of calibration coefficients is used.

Similarly, if the power level for the battery power the device is low, no recalibration is performed, but, instead either the latest set of calibration coefficients is used, or a special set of calibration coefficients is retrieved from the memory 120 to be used for the sensor calibrations. Other special conditions may be identified for which the calibration coefficients are not recalibrated but instead either the last set or a special set of calibration coefficients is used. These special sets are stored in memory 120 or another suitable storage.

Numerous modifications may be made and stay within the scope as defined in the appended claims.

We claim:

1. An apparatus for calibrating measurements from a MEMS sensor, said apparatus comprising:
   a calibration circuit adapted to receive an input signal indicative of a current measurement of a MEMS sensor, said calibration circuit adapted to generate, in response, a corresponding output signal based on at least one calibration coefficient;
   a memory adapted to store a plurality of sets of calibration coefficients, each set of calibration coefficients corresponding to a current temperature and including one or more calibration coefficients;

a temperature sensor adapted to generate a temperature signal indicative of a current temperature; and a microprocessor adapted to:

receive said temperature signal indication;

determine if a respective calibration coefficient for said temperature signal is available from said memory, said respective calibration coefficient being set in said calibration circuit for calibrating said input signal; and use, if no respective calibration coefficient is available, said input signal to calculate a calculated calibration coefficient.

2. The apparatus of claim 1, wherein said temperature sensor is adapted to measure an ambient temperature near said MEMS sensor.

3. The apparatus of claim 1, wherein said plurality of sets of calibration coefficients are prestored in said memory.

4. The apparatus of claim 1, wherein said microprocessor is further adapted to store said calculated calibration in said memory.

5. The apparatus of claim 1, further comprising:

an additional MEMS sensor; and an additional calibration circuit adapted to calibrate an additional input signal from said additional MEMS sensor.

6. The apparatus of claim 1, wherein said temperature sensor is adapted to generate said temperature signal based on information obtained from off site.

7. The apparatus of claim 1, wherein said microprocessor is adapted to:

compare said temperature signal to a previous temperature signal obtained at an earlier time; and determine if said current temperature is above or below a previous temperature, corresponding to the previous temperature signal, by a predetermined threshold.

8. The apparatus of claim 1, wherein said microprocessor is adapted to ignore one or more temperature changes when a specific condition is present.

9. The apparatus of claim 8, wherein a previous calibration coefficient is used by said calibration circuit.

10. The apparatus of claim 8, wherein a specific calibration coefficient is used by said calibration circuit, said specific calibration coefficient corresponding to said specific condition.

11. In a device including a microprocessor, a memory, and a MEMS sensor, a method for operating said MEMS sensor by said microprocessor, said method comprising the steps of:

obtaining, using a calibration circuit, a current signal indicative of a current temperature of said MEMS sensor;

checking a set of rules to determine if, based on said current signal, recalibration is necessary;

determining if a respective calibration coefficient for said current signal is available from said memory, said respective calibration coefficient being set in said calibration circuit for calibrating said current signal; and calculating, if no respective calibration coefficient is available, a calculated calibration coefficient based on said current signal.

12. The method of claim 11, wherein said memory includes a plurality of calibration coefficients, each calibration coefficient corresponding to a value of said current condition.

13. The method of claim 11, further comprising storing said calculated calibration coefficient in memory.

14. The method of claim 2, wherein said MEMS sensor is mounted on an integrated circuit (IC) substrate, and said step of obtaining said current signal includes measuring a temperature of said IC substrate.

15. The method of claim 2, further comprising:

determining if said current temperature is within a first range; and changing a present calibration coefficient if said current temperature is not within said first range.

16. The method of claim 11, further comprising:

determining a rate of change of said current temperature; and selecting a new calibration coefficient if said rate of change of said current temperature is above a predetermined range.

17. The method of claim 11, further comprising obtaining a signal indicative of said current temperature at a first location.

18. The method of claim 17, wherein in said first location is remote from said MEMS sensor.

19. The method of claim 11, wherein said MEMS sensor measures a scalar parameter.

20. The method of claim 11, wherein said MEMS sensor measures a multidimensional vector parameter.

21. The method of claim 11, further comprising:

detecting if a specific condition exists; and not performing, when said special condition is detected, calibration of an output of said MEMS sensor.

22. The method of claim 21, wherein, in said presence of said special condition, a previous calibration coefficient is used for calibrating an output of said MEMS sensor.

23. The method of claim 21, wherein, in said presence of said special condition, a specific calibration coefficient is used, said specific coefficient corresponding to said special condition.

24. The method of claim 21, wherein said special condition is a high demand on said microprocessor.

25. The method of claim 21, wherein said device includes a battery generating battery power for powering elements of said device, and said special condition is a low battery power level.

26. The method of claim 11, further comprising calibrating, using said calibration circuit and said calculated calibration coefficient, an output of said MEMS sensor.

27. An apparatus adapted to calibrate measurements from a MEMS sensor, said apparatus comprising:

a calibration circuit adapted to receive an input signal indicative of a current measurement of said MEMS sensor, said calibration circuit adapted to generate, in response, a corresponding output signal based on at least one calibration coefficient;

a temperature sensor adapted to generate a temperature signal indicative of a current temperature; and a microprocessor adapted to:

receive said temperature signal;

determine a rate of change of said current temperature; and select a new calibration coefficient if said rate of change of said current temperature is above a predetermined range, said new calibration coefficient being set in said calibration circuit for calibrating said input signal.

28. In a device including a microprocessor, a calibration circuit, a memory, and a MEMS sensor, a method for operating said MEMS sensor by said microprocessor, said method comprising the steps of:
- obtaining, using said calibration circuit, a current signal indicative of a current temperature of said MEMS sensor;
- determining, from said current signal, a rate of change of said current temperature;
- selecting a new calibration coefficient if said rate of change of said current temperature is above a predetermined range, said new calibration coefficient being set in said calibration circuit for calibrating said current signal; and
- calibrating, using said new calibration coefficient, an output of said MEMS sensor.

* * * * *